United States Patent
Sattler et al.

(10) Patent No.: US 8,229,964 B2
(45) Date of Patent: Jul. 24, 2012

(54) AD HOC WORKFLOW (75) Inventors: Juergen Sattler, Wiesloch (DE); Joachim Gaffga, Wiesloch (DE)

(73) Assignee: SAP AG, Walldorf (DE)

(*) Notice: Subject to any disclaimer, the term of this patent is extended or adjusted under 35 U.S.C. 154(b) by 1627 days.

(21) Appl. No.: 11/055,750

(22) Filed: Feb. 11, 2005

(65) Prior Publication Data
US 2006/0026166 A1 Feb. 2, 2006

Related U.S. Application Data (60) Provisional application No. 60/585,599, filed on Jul. 7, 2004, provisional application No. 60/623,874, filed on Nov. 2, 2004.

(51) Int. Cl.
*G06F 17/30* (2006.01)
(52) U.S. Cl. ........................................... 707/796
(58) Field of Classification Search ................ None
See application file for complete search history.

(56) References Cited

U.S. PATENT DOCUMENTS

| | | | | |
|---|---|---|---|---|
| 5,706,452 A * | 1/1998 | Ivanov | ............ | 715/751 |
| 6,243,092 B1 * | 6/2001 | Okita et al. | .......... | 715/866 |
| 6,917,962 B1 * | 7/2005 | Cannata et al. | ........ | 709/204 |
| 7,043,486 B2 * | 5/2006 | Cope | ................ | 707/100 |
| 2001/0039594 A1 * | 11/2001 | Park et al. | ............ | 709/311 |
| 2004/0034592 A1 * | 2/2004 | Hu et al. | .............. | 705/38 |
| 2004/0104933 A1 * | 6/2004 | Friedrich et al. | ...... | 345/751 |
| 2004/0107249 A1 * | 6/2004 | Moser et al. | ........... | 709/204 |
| 2004/0268240 A1 * | 12/2004 | Vincent, III | .......... | 715/513 |
| 2005/0086239 A1 * | 4/2005 | Swann et al. | ........... | 707/100 |

* cited by examiner

*Primary Examiner* — Bai D. Vu
(74) *Attorney, Agent, or Firm* — Kenyon & Kenyon LLP

(57) ABSTRACT

A collaboration system providing a guided procedure framework for handling business workflows which include non-persistent data. Data is copied from a business object linked to a database to a temporary business object that is independent from the database. Fields of a form are populated with data from the temporary business object. A workflow object including the populated form and guided procedures is provided to the user who initiated the workflow. After the user makes changes to the workflow and the data, the workflow object is relayed to a next recipient specified as having a task for the workflow. When all of the tasks necessary for the workflow are complete, data from the workflow object is integrated into the database.

18 Claims, 6 Drawing Sheets

AD HOC WORKFLOW

RELATED APPLICATIONS

Priority is claimed from U.S. Provisional Application Nos. 60/585,599 filed Jul. 7, 2004, and 60/623,874 filed Nov. 2, 2004, the contents of which are incorporated herein by reference.

FIELD OF THE INVENTION

Collaboration systems providing a guided procedure framework for handling business workflows which include non-persistent data.

BACKGROUND

Collaboration systems integrate work on one or more projects by several concurrent users at separate workstations. Examples of collaboration systems include groupware products such as Microsoft® Outlook® and Lotus® Notes®, which among other things, handle e-mail, tasks, and scheduling. More elaborate collaboration systems such as SAP® Business One supplement groupware with integrated management capabilities, such as financial management, customer relationship management, and sales management capabilities that provide access to real-time information.

Existing collaboration systems support a variety of business processes. An example of a business process supported on some collaboration systems is a workflow. A workflow routes tasks to groups of users, rather than a single individual. Workflows automate business processes by integrating tasks across departments, applications, and system boundaries. A workflow maps individual tasks needed to complete the workflow to users/groups, automatically informing users/groups of user of their role in the workflow and providing them with whatever information is required for the task. Steps which do not require user intervention may be carried out automatically.

Collaboration systems include subroutines to process user responses, and may include scheduling escalation procedures (e.g., adjust due dates; send reminders; reassign tasks) to assure that the workflow is completed in a timely manner. The workflow process creates a precise audit trail and can provide powerful analysis reporting to allow future optimization of the process.

A basic concept behind workflows is the idea of the "business scenarios" in which particular events or activities are anticipated to occur during the normal course of business. When a process needed to support such events/activities can be mapped out into a series of discrete, assignable tasks, a workflow can be created to support the process. An example of a business scenario in the banking context would be the handling of a loan request. Based on conventional business practice, a series of steps and particular information is needed in order to evaluate the request. These steps, who should complete them, and what information is needed can be mapped into a workflow, allowing the collaboration system to guide the loan request from receipt to decision with minimal human intervention.

The information-core of a workflow is a business object. A business object represents an entity in the real business world. For example, a business object can represent customers, contact persons, products, sales opportunities, sales activities, sales promotions, business transactions (e.g, a purchase order), a contract, a policy, and an application (e.g., a loan application). Each business object has elements that can be modeled to capture business data.

The inner structure of a business object is ordinarily concealed from a user. A business object may comprise persistent data (e.g., data tied to a database) and embedded business logic. The business logic is composed of machine-executable instructions which govern the behavior and properties of the object, including how the data is organized for presentation and the inter-relationship of data. Properties of the object may represent the attributes of the entity in the real business world, providing business "meaning" behind object data. For example, a Sales Order object can have properties like order number, order date, and quantity. The business logic may also include machine-executable instructions for performing specific operations such as the manipulation and validation of data. For example, the Sales Order object can have a method to calculate and get the line-items total.

While collaboration system have many advantages, these same systems have not provided users the possibility to extend a collaboration process outside of established workflow scenarios to gain support from other colleagues when seeking to solve a problem or answer a question. This lack of flexibility is a consequence of the real-time nature of collaboration system operations; workflows operate on business object data real-time, such that changes to data within a workflow are immediately reflected throughout the system (i.e., the data is "persistent" across the system).

A user could create an independent collaboration with other users via groupware e-mail or tasks without using a workflow provided by the business system. However, such independent collaborations are not tracked by the business system. As a result, the existence of independent collaborations may be unrecognized by others within an organization, increasing the likelihood of duplicated efforts. Further, such independent collaborations do not use a snapshot of the object which can be used to store the data after resolving the problem.

A related problem occurs when a database-reliant process requires data that is incompatible with the database, such as when an order is received in a floating monetary unit (i.e., most of the world's currencies) that is not recognized in the database. Ideally, the business system would recognize the currency and automatically handle value conversion, adjusting for changes in the exchange rate so that the actual value of the order is known at the time of fulfillment. With existing systems, a user is left to choose between handling the process outside of a business system workflow, adjusting the database to handle the unit, or converting the unit into a recognized unit for entry.

Handling the process outside the business system forfeits most of the efficiencies gained from utilizing an integrated system to collaborate. The second and third choices run the risk that currency fluctuation will introduce inaccurate charges. For example, if entry is delayed so that the database can be adjusted and a swing occurs in the exchange rate during that delay, the recorded charges are inaccurate. As another example, if the currency is converted into a known unit for entry and a swing occurs in exchange rate before the order is filled, the recorded charges are inaccurate.

As it is preferred in business to handle processes in an orderly, predictable manner and to create an audit trail, there is a need a system that provides the advantages of a workflow without the rigidity of a real-time system.

DETAILED DESCRIPTION

A collaboration system is disclosed in which the end user is given the possibility to initiate a workflow out of each business scenario in which the end user needs support or help from others. The technical vehicle for the collaboration system is to bundle a temporary copy of a business object with guided procedures that automatically manage the acquisition and distribution of information and assigning of tasks. Using a temporary copy of the business object data affords this "ad hoc" workflow a degree of flexibility and independence, while providing the tracking, support, and appearance of a conventional workflow. While the end of an ad hoc workflow may include integrating the temporary copy of the data into the collaboration system, the intervening independence frees the workflow from the rigidity of the real-time system. This framework leads to a very open process by which a workflow is led to finalization. The guided procedures control the workflow, acquiring and processing information, and sending messages and tasks the designated people and groups, either in a series (e.g., from task-to-task), or in parallel (e.g., contemporaneous tasks).

Figure 1:
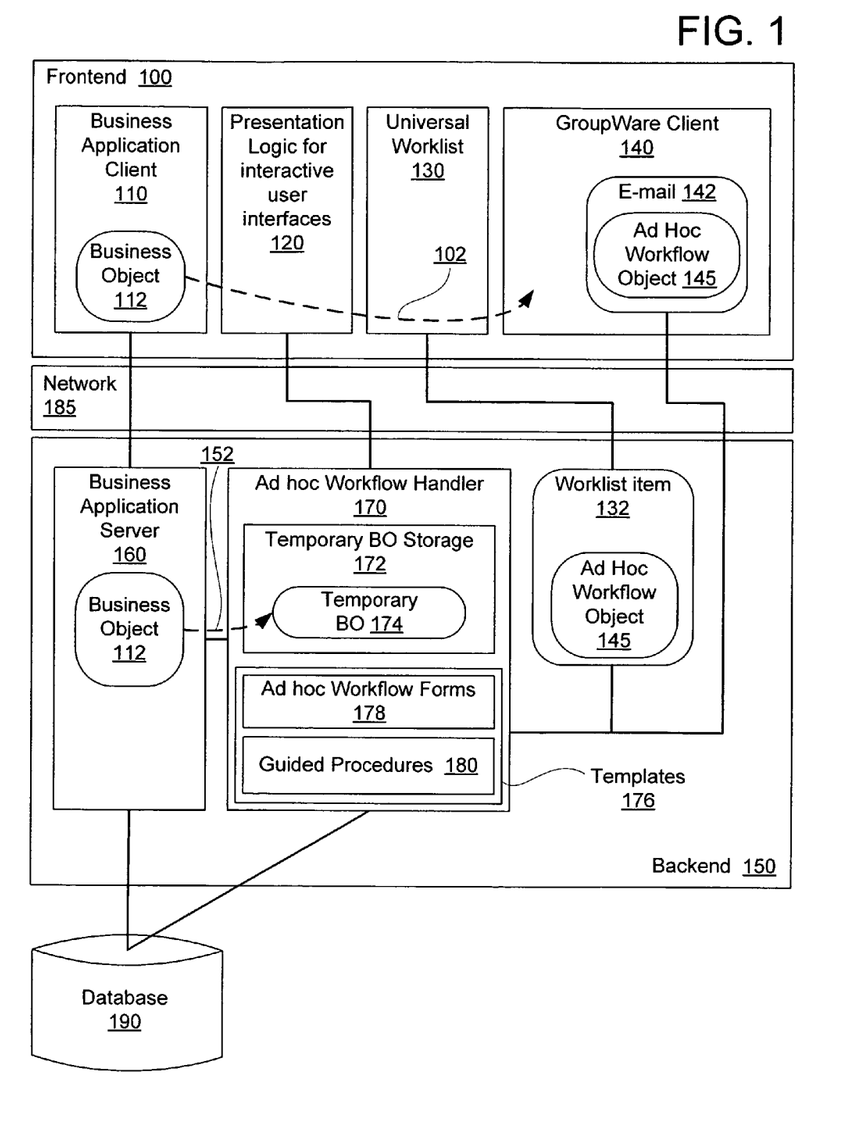
FIG. 1 is a block diagram illustrating an overview of an example system architecture for an ad hoc workflow process.

FIG. 1 illustrates an example of an architecture for the system. Users interact with a frontend computer system 100 (e.g., a computer terminal), linked to a backend computer system 150 (e.g. a server) across a network 185. As part of a conventional business process, a user interacts with a business object 112 via a business application client 110 on the frontend system 100. The business object 112 is mirrored on a business application server 160 on the backend 150, which is tied to a database 190. Changing data field entries in the business object 112 changes the source data on the database 190.

As an embodiment of the invention, the user working with the business application client might wish to send colleagues a snap-shot of a business object 112 as part of a workflow. The end user initiates an ad hoc workflow by using a general command function which is available to all applications. For example, the end-user may drag-and-drop (102) the business object 112 into an e-mail. An ad hoc process is initiated in which a temporary business object 174 is created (152) as a snap-shot of the business object 112. A form 200 (FIG. 2) is "populated" with data from the temporary business object. An ad hoc workflow object 145 comprising the form 200 is inserted into the e-mail instead of business object 112.

Whereas the business object 112 is persistent with data in a database 190, the temporary business object 174 has no persistence with the database 190 or with the original business object 112. The temporary business object 174 data is shared during the ad hoc process and may be at least partially reintegrated into the database 190 in the end (i.e., finalization). The workflow object 145 is a container used to guide the transfer of the data from one recipient to another. Header data may be included to identify the particular workflow.

For each business object 112, an ad hoc workflow handler 170 of the collaboration system has a template 176 for a workflow process. The templates 176 may include, among other things, forms 178 and guided procedures 180. Each template may be associated with a particular object type. By comparing the type of the business object 112 with the types associated with the templates 176, the workflow handler 170 identifies which templates may be used for a given business object 112. Template selection may be automatic, based upon the type of business object, or if several templates might be appropriate for a particular business object, selection of the template may include interaction with the user.

Figure 3:
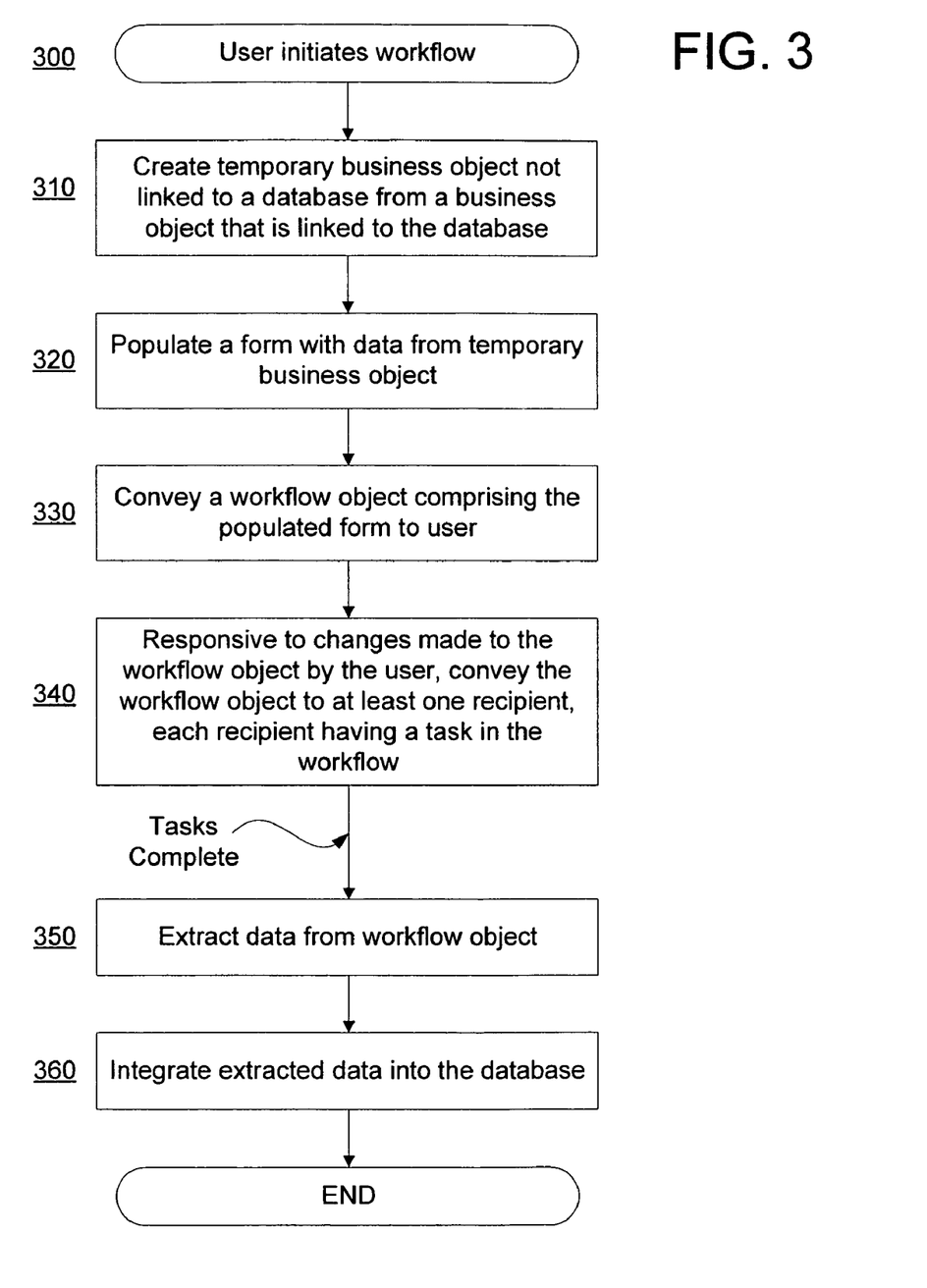
FIG. 3 illustrates steps in an example embodiment of ad hoc workflow.

FIG. 3 illustrates an example of a workflow process as an embodiment of the invention. After a user initiates a workflow (300), a temporary copy of the business object 174 is created (310) from a persistent business object 112. Unlike the persistent business object 112, the temporary business object 174 is not linked to the database 190. Fields of a form 200 are populated (320) with data from the temporary business object 112. The workflow object 145, including the populated form 200 are conveyed (330) to the user who initiated the workflow for review and changes. Responsive to changes made to the workflow object 145 by the user, the workflow object is then conveyed (340) to at least one recipient. Each recipient is assigned a task in the workflow. Once the tasks are completed, data is extracted (350) from the workflow object, and the extracted data is integrated (360) into the database.

Figure 4:
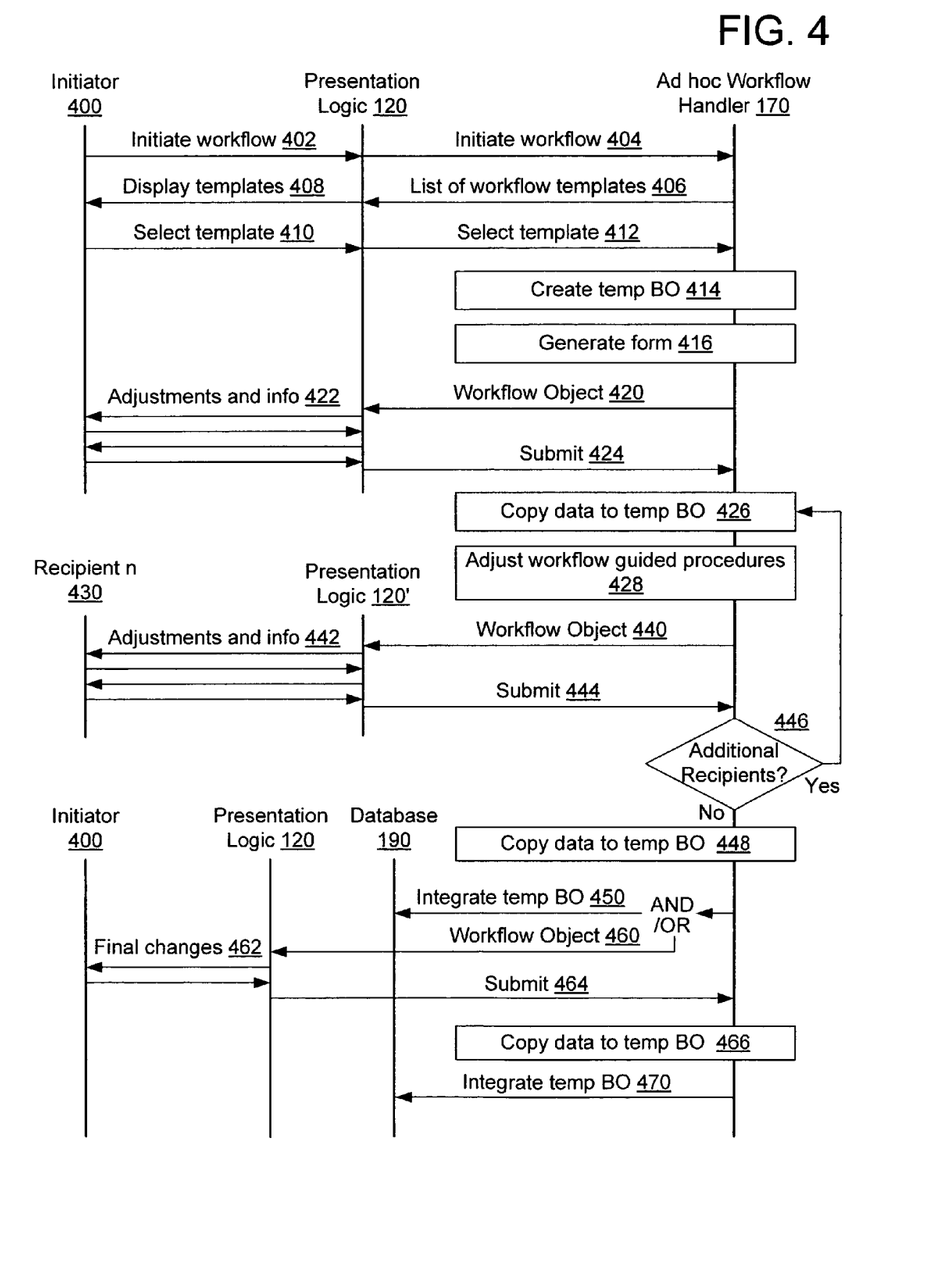
FIG. 4 illustrates a flow diagram of an ad hoc workflow process as an example of the invention.

FIG. 4 illustrates a further example of a workflow process. A user 400 initiates (402/404) the ad hoc workflow using a general command function available to one or more applications. Examples of initiation include choosing a menu item, dragging-and-dropping a business object, or pushing a button corresponding to "start workflow." The user 400 may then presented (406/408) with a list of workflow templates 176 for preconfigured workflows. For example, there might be a template for ad hoc processing of a purchase order in a currency not already provided for in the database 190.

Responsive to the user's selection of a template 410/412, the ad hoc workflow handler 170 creates (414) the temporary business object 174 in temporary business object storage 172. Data can be included in the temporary business object 174 that is otherwise incompatible with the database 190.

The ad hoc workflow handler 170 populates (416) the form 200 specified in the selected template with data from the temporary business object 174. The form 200 for the selected workflow are then conveyed (420) to the user 400 as an ad hoc workflow object 145. Guided procedures from the template selected for the workflow may be used by the workflow handler 170 to manage the process and may also be conveyed (420) to the user's terminal in the workflow object.

The user 400 interacts with the ad hoc workflow object 145 through a frontend system 100 including presentation logic for interactive user interfaces 120. The presentation logic 120 provides a user interface (UI) which may prompt the user 400 for information and adjustments 422, copying the answers to internal tables (e.g., temporary business object 210, which may be a copy of temporary business object 174 or be a copy of a subset thereof, and is encapsulated in the workflow object 145) or storing the answers directly in the form 200. Examples of the presentation logic 120 include a collaboration system software interface, an interface created by a plug-in for generic business software, or a web browser interface. The prompts used by the presentation logic 120 may be included in the workflow object 145 as an interaction script 250.

Information is collected 422 from the user 400, including adjustments to the workflow and additions and changes to data. Examples of the information collected include adjustments to the workflow timetable 260 (e.g., deadlines), adjustments to the workflow path specifiers 240 (e.g., designated or default recipients), and initiator notes and comments.

The interaction script 250 may comprise instructions for an executable program. For example, if a workflow defines a series of deadlines and the user adjusts one of the deadlines, an embedded script may provide the user an option of automatically reconciling the remaining deadlines to the new timetable. Likewise, if a user enters a deadline out-of-order that creates a potential conflict in the workflow (e.g., setting a deadline for a first task after the deadline for a second task, where the second task requires completion of the first task), a script may flag the mistake for the user.

The behavior of each ad hoc workflow may be customized by an interface which allows the initiator to select from several choices for workflow behavior, such as: the initiator is the only one who can adjust the business object at finalization (i.e., the end of the workflow); and the next recipient is allowed to make changes to the business object. If a recipient is allowed to make changes, the guided procedure may specify whether the initiator is or is not notified of the changes.

Any user-interface channel may be used to present the list of workflow templates and to collect the user interface information. For example, the interface and templates may be part of the collaboration system software, may be scripts or plug-ins to generic business software (e.g., groupware, word processing), or may be mark-up language pages (e.g., web browser pages). Whereas the data in a conventional business object and database might be in a proprietary or a non-standard format, the copied data may be converted to a standards-based markup language (e.g., XML) to facilitate offline handling of the workflow and the use of open protocols for the user interface. For example, if the workflow is to be presented to recipients using a web-browser interface, using a markup language for form data simplifies form portability. This also simplifies programming and lessens the overhead required for any embedded programming instructions or scripts included with the templates.

Once the form 200 and any user-prompt sequence is complete, the data may be submitted 424 to the backend system 150 for further processing. The data, when submitted, may include the form 200, the temporary business object 210 containing the data from the form 145, the guided procedures 220, or a combination thereof. The temporary business object 210 may be a copy of temporary business object 174 or may contain a subset of the data and fields from temporary business object 174. The temporary business object 210 may contain additional information for the workflow that is not presented in the form 200.

After the data is received at the backend system 150, it may be copied (426) into temporary business object 174. Any specified adjustments to the guided procedures 220 are made (428), and may also be stored on the backend 150. If the workflow specifies that a different form is to be used for the next destination group/recipient 430, the workflow handler 170 extracts the form for insertion into the workflow object 145, populating the form in accordance with the workflow.

A workflow object 145 is then transmitted 440 by the workflow handler 170 to the next recipient 430 by, for example, e-mail or a worklist posting. The workflow handler 170 may set a time limit for receiving action on the workflow object 145. If the workflow object 145 is not picked up or acted upon before a time limit expires, the workflow handler 170 may automatically send a reminder or move the object 145 to a different destination. The duration of the time limit may be specified by an algorithm or heuristic, in a look-up table, by the workflow template, by the initiator/recipient, or some combination thereof. The type of action taken at the end of the time limit may likewise be specified.

The recipient 430 makes any entries or adjustments 442 to the workflow object 145 via presentation logic 120' and submits 444 the data to the workflow handler 170. The workflow handler 170 then checks (446) whether the workflow specifies additional recipients. If additional recipients are specified, the data on the backend 150 is updated and the workflow object 145 is transmitted to the next recipient. The same or a different form 200 may be included in the workflow object 145 each time it is transmitted by the workflow handler 170, depending upon the task assigned to each recipient (i.e., assigned role) in the workflow. If the object is forwarded to additional recipients, a progress report may be sent to the originator. If no further recipients are specified, the information entered by the last recipient into the form may be copied 448 into the business object 174.

There are several ways a workflow may reach then finalization. For example, the workflow object may be forwarded 460 to the initiator 400 or a reviewer. The initiator/reviewer can then adjust 462 the data before submitting 464 the data to the workflow handler 170, which updates 466 the temporary business object 174 and then integrates 470 the temporary business object 174 into the database 190. The data may also be integrated 450 without initiator/reviewer adjustment.

Figure 2:
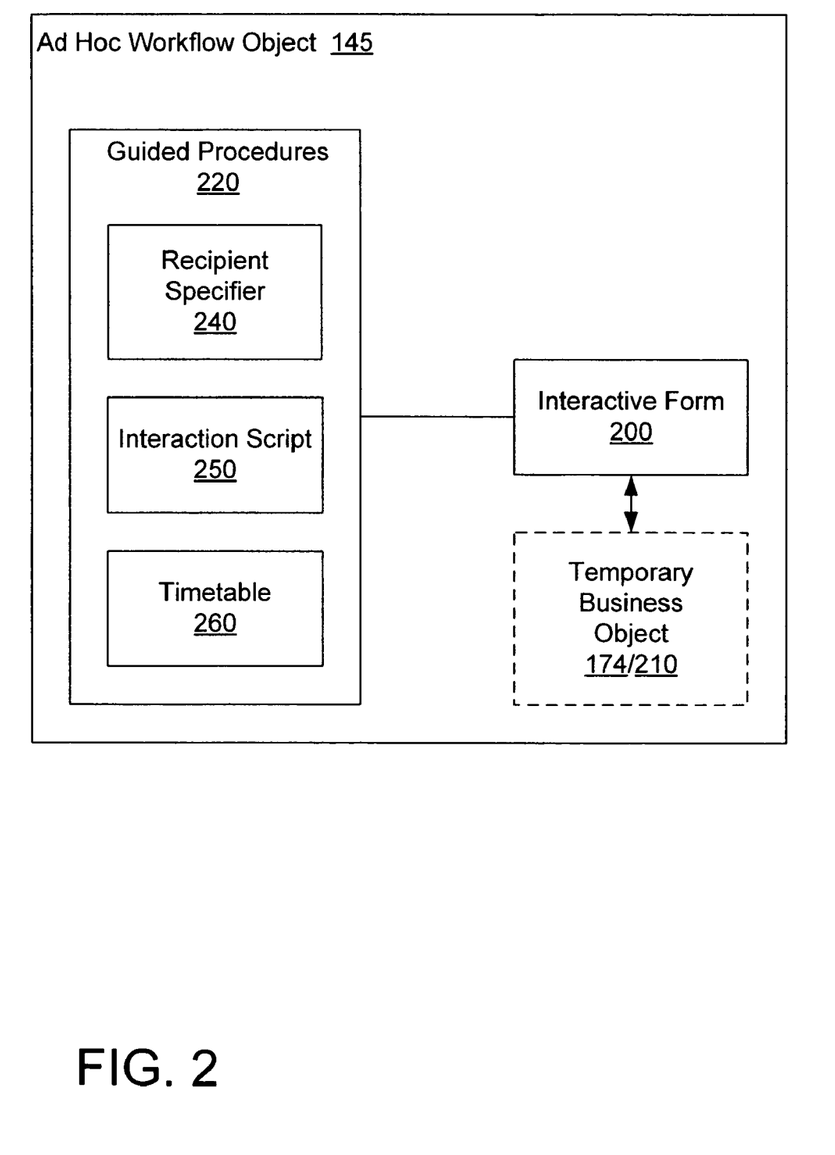
FIG. 2 is an example of an ad hoc workflow object.

As embodiment of the invention, business object data conveyed across the network 185 in the workflow object 145 is stored in the form 200 itself. As another embodiment, the form 200 is a user interface (UI) shell in which the fields of the form 200 link to a storage location within the workflow object 145, such as tables of an embedded temporary business object 210. As another embodiment, the form 200 is a UI shell in which the fields of the form 200 link back across the network 185 to temporary business object 174. As another embodiment, data is stored in the form 200, but is reconciled with local storage (e.g., tables within temporary business object 210) before submission.

Figure 5:
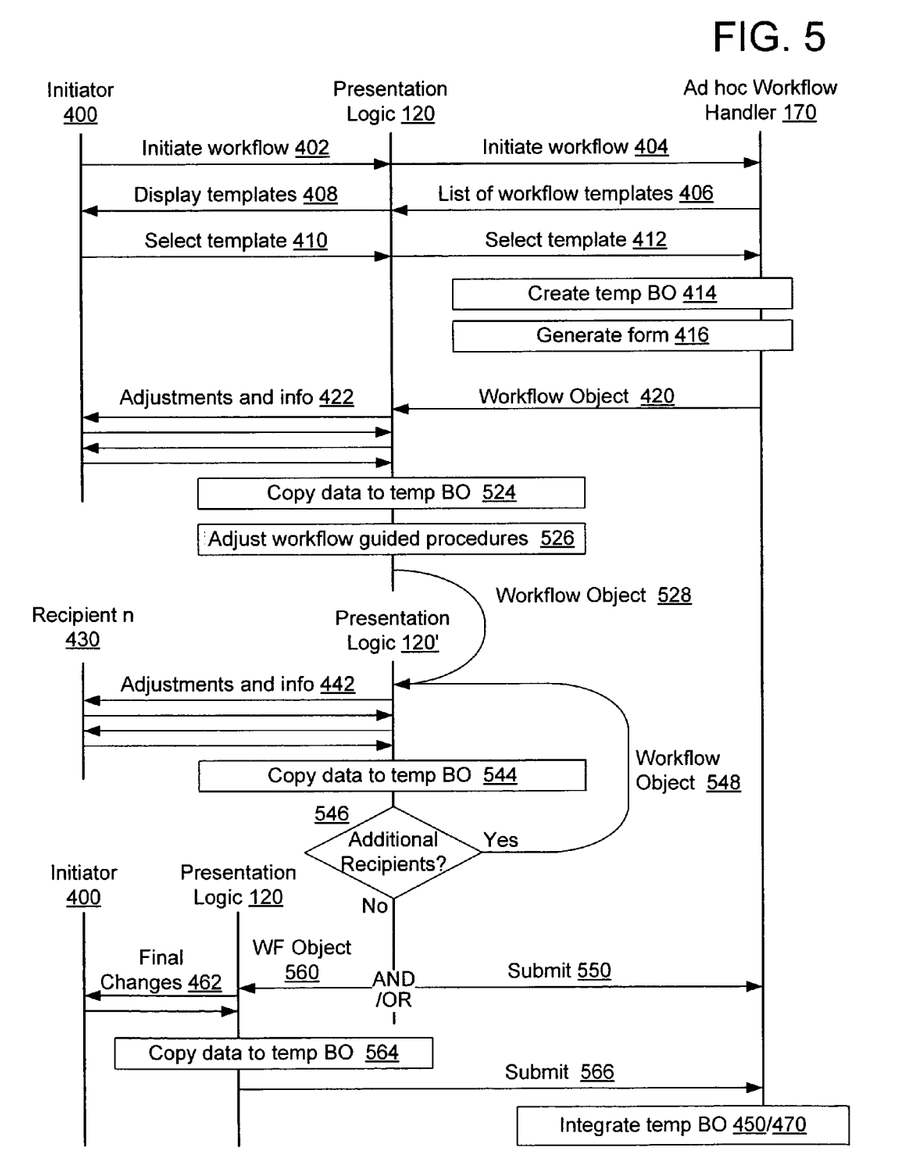
FIG. 5 illustrates another flow diagram of an ad hoc process as an example of the invention.

FIG. 5 illustrates another example of a workflow process. In this embodiment, the workflow object 145 is passed from user-to-user without intermediate returns to the ad hoc workflow handler. Temporary business object 210 acts as a portable repository for data during the process. Changes to the workflow entered 422 by the user 400 are made to the temporary business object (524) and guided procedures (526), and then forwarded 528 to the next recipient 430 by way of e-mail or a worklist posting. To facilitate tracking and creation of an audit trail, a message may also automatically be sent to the workflow handler 170 each time the workflow object is forwarded to another recipient.

After a recipient 430 enters any workflow adjustments and information 442 and the changes are stored 544, the guided procedures 220 extract the next recipient from the recipient specifier 240 and forward 548 the workflow object 145 to the next recipient. If no additional recipients are specified (546), then in accordance with a workflow script, the guided procedures submit (550) the workflow object 145 to the ad hoc workflow handler 170 to be reconciled 450 with the original business object 112 and the database 190. The workflow object 145 may also be conveyed (560) to the initiator 400 or a reviewer for review and any final changes 462. If sent for review, then after the temporary business object 210 is updated 564, it may be submitted 566 to the workflow handler 170 to be reconciled 470 with the database 190.

Figure 6:
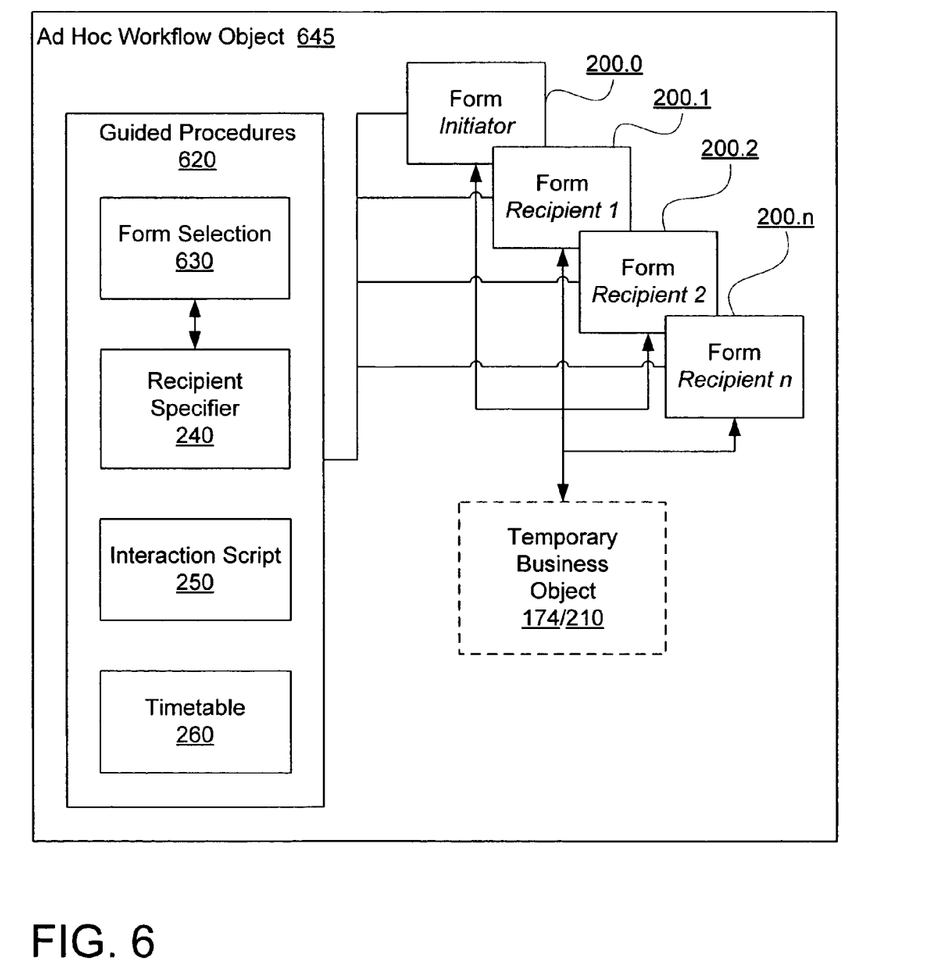
FIG. 6 is another example of an ad hoc workflow object.

FIG. 6 illustrates an ad hoc workflow object 645 which is interchangeable with ad hoc workflow object 145 in the above embodiments. A difference is that if different recipients receive different forms, a plurality of forms (200.0-200.n) are included in the object 645. Guided procedures 620 include a form selection 630 script for each recipient. Workflow object 645 facilitates a seamlessly transition between online and offline processing, even when plural forms are used in the workflow. Each form (200.0-200.*n*) may be a shell linked to the temporary business object 210 encapsulated in the workflow object 645 (for on- and off-line processing), a shell linked to the temporary business object 174 on the backend system 150 (for on-line processing), or may independently hold data (for on- and off-line processing). The script 630 may also discard forms once they are no longer to be used in the workflow.

While the workflow process in the various embodiments demonstrate a linear workflow, the workflow may also comprise parallel components. For example, referring to the floating currency example, a workflow template 176 may specify a workflow to act upon a purchase order by applying an ad hoc process, and in parallel, assign a workflow task to update the database to include the new currency. At the end of the workflow, if the ad hoc process is complete but the database 190 is not ready, the temporary business object data 174/210 may be stored by the workflow handler 170 until the database update is complete.

Each process supported by the workflow can be customized separately. The process can run via groupware in offline mode, allowing both on-and-offline collaboration on ad hoc business processes.

The recipient 430 may be part of a worklist group. Any person from a group may pick up an item 132 from the universal worklist 130. Escalation processes can automatically adjust dates and deadlines. For example, if a worklist item 132 is not picked up or not acted upon, the workflow handler 170 or other component of the collaboration system may automatically move the worklist item 132 to another destination, adjust the dates and deadlines, and/or send reminders or advisories.

The data in the workflow object 145/645 may be protected to limit which destination groups or individuals can modify form-field content. These protections may be specified by the workflow template 176 or specified by the user initiator 400. These protections may depend upon a "class" of users in a particular destination group. These protections may also depend on a position of a task along the workflow path. For example, if a workflow includes four sequential tasks, a data field may be preset to be editable during the second task, but not the third, even if the recipients of the of the second and third tasks are otherwise of a same protection class.

When someone works on a workflow task, they may or may not be given the option of adjusting or setting who the next recipient is, if any. The recipient specifiers 240 of the workflow may be preconfigured with a default path, or may present the initiator or recipient with several possible choices for the subsequent path. Even when the path is set, a recipient may be given the option of either submitting the form for transmission to the next designated recipient, or sending it back to the initiator as-is. Some workflow processes may require that certain entries be approved by more than one recipient.

The ad hoc workflow handler 170 may provide audit, tracking and status information for ad hoc workflows in a similar manner as is done for conventional workflows.

The workflow templates 176 may include both conventional workflow templates utilizing persistent data and ad hoc workflows templates utilizing non-persistent data. Generic workflow templates may include a script to determine whether to use a conventional workflow with a persistent business object or to use an ad hoc workflow with non-persistent, based on information received from the initiator. For example, if a currency is entered that is not included in a list of currencies recognized in the database, the workflow template can automatically shift the process from conventional to ad hoc.

Frontend system 100 and backend system 150 may each comprise a computer terminal and/or one or more servers, having a storage component for storing machine-readable instructions for performing the various processes of the embodiments. The storage component may be any type of machine readable medium (i.e., one capable of being read by a machine) such as a compact disk, flash memory, hard drive memory, floppy disk memory, DVD-ROM, CD-ROM or any type of machine readable (computer readable) storing medium. Frontend system 100 and backend system 150 may each also include system-addressable memory (e.g., random access memory, cache memory) to store data and/or sets of instructions that may be included within, or be generated by, the machine-readable instructions when they are executed by a processor on the respective computer system.

Several embodiments of the invention are specifically illustrated and/or described herein. However, it will be appreciated that modifications and variations of the invention are covered by the above teachings and within the purview of the appended claims without departing from the spirit and intended scope of the invention.

What is claimed is:

1. A method for modifying automated business processes in a computer system, comprising:
   opening a business object representing a workflow in the computer system, the business object having executable logic that:
   1) defines workflow operations to be performed within the computer system and workflow recipients to collaboratively perform them, wherein workflow operations are tasks to be performed to complete execution of the workflow and
   2) stores data acquired during performance of the workflow, the business object having persistence in storage of a business application server of the computer system;
   responsive to a command from a user terminal to modify the workflow, copying data from the opened business object to a temporary business object, the temporary business object not having persistence in storage of the business application server;
   modifying the workflow definitions of the temporary business object according to user input;
   executing the modified workflow definitions of the temporary business object and storing data acquired from the execution in the temporary business object; and
   when the workflow of the temporary business object is complete, extracting data from the temporary business object and integrating the extracted data into the database.

2. The method of claim 1, further comprising:
   selecting a template for the workflow from a plurality of templates, the template comprising a set of guided procedures and a first form having fields to be populated with data from the temporary business object, the set of guided procedures specifying at least an identifier for at least one recipient.

3. The method of claim 2, wherein said selecting the template comprises receiving, from the user terminal, a selection of the template from a list of templates.

4. The method of claim 2, wherein said selecting the template comprises:

responsive to the command from the user terminal to modify the workflow, extracting a business object type from the business object; and comparing the business object type with types of templates of the plurality of templates to determine which templates are compatible with the workflow.

5. The method of claim 4, wherein said selecting the template further comprises receiving, from the user terminal, a selection of the template from a list of the compatible templates.

6. The method of claim 2, wherein the template further comprises at least a second form, the method further comprising:

populating fields of said at least a second form with data from the temporary business object, where there is a difference between the fields of the first form and the fields of said at least a second form, wherein the workflow comprises a plurality of tasks, and the guided procedures further specify which form is used for which task.

7. The method of claim 1, further comprising:

when the workflow is complete, conveying the workflow object to the user terminal, said integrating the extracted data into the database being responsive to authorization from the user terminal.

8. The method of claim 1, further comprising:

responsive to modification of the workflow definitions at the user terminal, conveying the temporary business object to at least one recipient, each recipient having a task in the workflow.

9. The method of claim 8, further comprising:

populating fields of a first form with data from the temporary business object;

receiving, from the user terminal at a computer system comprising the database, the temporary business object including the changes and thereafter conveying the workflow object to at least one recipient;

wherein the computer system performs each of said copying data, said populating fields, said conveying the workflow object to the user terminal, said conveying the workflow object to at least one recipient, said extracting data, and said integrating the extracted data into the database.

10. The method of claim 8, wherein said conveying the temporary business object to at least one recipient comprises conveying the temporary business object from the user terminal directly to a recipient having a first task in the workflow.

11. A machine-readable medium storing instructions adapted to be executed by a processor to perform a method for modifying automated business processes in a computer system, comprising:

opening a business object representing a workflow in the computer system, the business object having executable logic that:

1) defines workflow operations to be performed within the computer system and workflow recipients to collaboratively perform them, wherein workflow operations are tasks to be performed to complete execution of the workflow, and 2) stores data acquired during performance of the workflow, the business object having persistence in storage of a business application server of the computer system;

responsive to a command from a user terminal to modify the workflow, copying data from the opened business object to a temporary business object, the temporary business object not having persistence in storage of the business application server;

modifying the workflow definitions of the temporary business object according to user input;

executing the modified workflow definitions of the temporary business object and storing data acquired from the execution in the temporary business object; and when the workflow of the temporary business object is complete, extracting data from the temporary business object and integrating the extracted data into the database.

12. The machine-readable medium of claim 11, the method further comprising:

selecting a template for the workflow from a plurality of templates, the template comprising a set of guided procedures and a first form having fields to be populated with data from the temporary business object, the set of guided procedures specifying at least an identifier for said at least one recipient.

13. The machine-readable medium of claim 12, wherein said selecting the template comprises receiving, from the user terminal, a selection of the template from a list of templates.

14. The machine-readable medium of claim 12, wherein said selecting the template comprises:

responsive to the command from the user terminal to modify the workflow, extracting a business object type from the business object; and comparing the business object type with types of templates of the plurality of templates to determine which templates are compatible with the workflow.

15. The machine-readable medium of claim 14, wherein said selecting the template further comprises receiving, from the user terminal, a selection of the template from a list of the compatible templates.

16. The machine-readable medium of claim 12, wherein the template further comprises at least a second form, the method further comprising, for at least one recipient:

populating fields of said at least a second form with data from the temporary business object, where there is a difference between the fields of the first form and the fields of said at least a second form, wherein the workflow comprises a plurality of tasks, and the guided procedures further specify which form is used for which task.

17. The machine-readable medium of claim 11, the method further comprising:

when the workflow is complete, conveying the workflow object to the user terminal, said integrating the extracted data into the database being responsive to authorization from the user terminal.

18. The machine-readable medium of claim 11, the method further comprising:

responsive to modification of the workflow definitions at the user terminal, conveying the temporary business object to at least one recipient, each recipient having a task in the workflow.

* * * * *